United States Patent [19]

Kurahashi et al.

[11] Patent Number: 4,666,795
[45] Date of Patent: May 19, 1987

[54] CLAD MATERIAL FOR ORNAMENTAL USE

[75] Inventors: Kazuo Kurahashi; Nobutoshi Onodera, both of Hamamatsu, Japan

[73] Assignee: Nippon Gakki Seizo Kabushiki Kaisha, Japan

[21] Appl. No.: 737,233

[22] Filed: May 23, 1985

[30] Foreign Application Priority Data

May 31, 1984 [JP] Japan ................. 59-111614

[51] Int. Cl.⁴ ........................... B32B 15/01
[52] U.S. Cl. ..................... 428/660; 148/410; 148/411; 148/414; 420/443; 420/485; 420/486; 420/487; 420/494; 428/674; 428/680
[58] Field of Search ............ 428/660, 674, 680; 148/407, 410, 411, 414; 420/441, 443, 457, 485, 486, 487, 494; 351/41, 117

[56] References Cited

U.S. PATENT DOCUMENTS

| | | | |
|---|---|---|---|
| 2,228,310 | 1/1941 | Gruber et al. | 420/494 |
| 4,338,130 | 7/1982 | Burkett | 420/486 |
| 4,427,746 | 1/1984 | Takamura | 428/660 |
| 4,450,210 | 5/1984 | Takamura et al. | 428/660 |

FOREIGN PATENT DOCUMENTS 6815 1/1976 Japan ................. 420/443

OTHER PUBLICATIONS

Allen, *Metallurgy Theory and Practice,* American Technical Society, Chicago, 1969, pp. 445-446.

Primary Examiner—Melvyn J. Andrews
Assistant Examiner—Robert L. McDowell
Attorney, Agent, or Firm—Lerner, David, Littenberg, Krumholz & Mentlik

[57] ABSTRACT

In construction of a clad material for ornamental use such as eyeglass frames and watch bands, use of age-hardenable alloy sheath followed by age-hardening enables production of product with light weight, high mechanical strength, excellent workability and good fit to brazing and plating.

15 Claims, 3 Drawing Figures

CLAD MATERIAL FOR ORNAMENTAL USE

BACKGROUND OF THE INVENTION

The present invention relates to a clad material for ornamental use, and more particularly relates to an improvement in construction of a Ti including clad material for ornamental use such as eyeglass frames.

Ti including clad material is already known. For example, a core made of Ti or Ti-base alloy is covered with a sheath clad thereto and made of Ni, Ni-base alloy, Au-base alloy or Cu-9%Ni-2%Sn alloy. Inclusion of Ti in the core results in light weight and high mechanical strength whereas inclusion of the alloys in the sheath results in excellent workability, good fit for brazing and plating, and beautiful surface gloss. The conventional clad materials of this type are well used for eyeglass frames and watch bands.

Despite these advantages, the conventional clad material of this type are accompanied with several unavoidable drawbacks. In the case of the above-described clad materials, the alloys used for the sheath have relatively large specific gravities and low mechanical strength. As a consequence, there is a limit to increase in thickness of the sheath which obviously improves workability and fit to brazing and plating. Whereas increase in rate of inclusion of Ti in the core, which obviously results in light weight and high mechanical strength, unavoidably mars workability of the clad material. Low workability disenables production of eyeglass frames of highly intricate configuration and design. Although it is thinkable to enlarge the cross section of the clad material, increased cross section inevitably connects to heavy weight.

SUMMARY OF THE INVENTION

It is the object of the present invention to enable industrial scale production of a clad material having light weight and high mechanical strength with ideal workability and good fit to brazing and plating.

In accordance with the basic aspect of the present invention, a clad material comprises a core made of Ti or Ti-base alloy and a sheath clade thereto and made of age-hardenable alloy.

DESCRIPTION OF THE PREFERRED EMBODIMENTS

Figure 1:
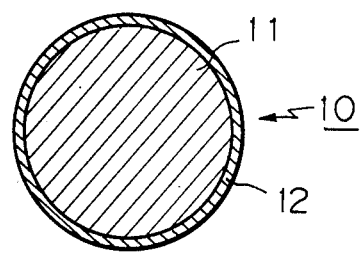
FIG. 1 is a transverse cross sectional view of one example of the clad material in accordance with the present invention.

The clad material shown in FIG. 1 takes the form of a wire 10 in which a core 11 made of Ti or Ti-base alloy is wholly covered with a sheath 12 made of age-hardenable alloy. The alloy used for the sheath should have good fit to brazing and plating and significant age-hardenability. In addition, the alloy should have excellent workability before age-hardening. For example, Cu-(10~25%)Ni-(5~25%)Mn alloys, Cu-(5~15%)Ni-(1~8%)Al alloys, Cu-(0.1~5%)Be alloys, Cu-(0.1~5%)Be-(0.1~10%)Ni alloys, Ni-(1~30%)Sn alloys and Ni-(4~20%)Cr-(0.1~2.0%)Be-(0.1~2.0%)Cu alloys are preferably used.

The cross sectional surface ratio of the sheath 12 with respect to the core 11 should preferably be in a range from 5 to 25%. When the ratio exceeds the upper limit, cladding cannot be carried out smoothly due to the difference in mechanical strength between the sheath 12 and the core 11. Too low ratio also disenables smooth working.

In the case of the clad material shown in FIG. 1, cladding is followed by age-hardening in order to raise mechanical strength of the sheath 12. High mechanical strength of the sheath 12 connects to the possibility of its thinner construction which obviously results in light weight. Thanks to the excellent workability and good fit of the sheath 12 to brazing and plating, working should preferably precede age-hardening. Inclusion of Ti in the core 11 significantly improves light weight and springiness of the clad material 10 which is in turn well suited for production of eyeglass frames with intricate configuration and design.

Figure 2:
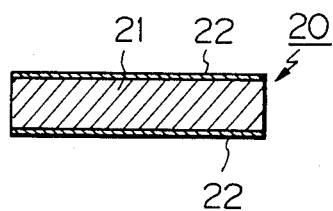
FIG. 2 is a transverse cross sectional view of another example of the clad material in accordance with the present invention.

The clad material shown in FIG. 2 takes the form of a plate 20 in which a core 21 made of Ti or Ti-base alloy is sandwiched between a pair of sheaths 22 made of age-hardenable alloy.

EXAMPLES

A test piece (No. 1) made of the clad material in accordance with the present invention and other test pieces (Nos. 2 to 4) made of other clad materials were prepared.

In production of the test piece No. 1, a Cu-20%Ni-20%Mn alloy sheath was clad to a Ti core (JIS kind 2 round rod) at a cross sectional surface ratio of 18%. After cladding, the clad material was subjected to intermediate annealing at 560° C. and wire drawing to a wire of 2.6 mm diameter. Next, the wire was subjected to continuous annealings at 560° C. in $N_2$ gas environment for solution of the sheath alloy. Subsequent wire drawing produced a wire of 1.3 mm diameter which was then subjected to age-hardening at 380° C. for 2.5 hrs in $N_2$ gas environment. The rate of working was 75%.

For comparison, the wire before application of the age-hardening was used at the test piece No. 2.

For further comparison, the test piece No. 3 was made of Ti only. The test piece No. 4 included a Ni sheath clad to a Ti core at a rate of working same as the test piece No. 1.

Figure 3:
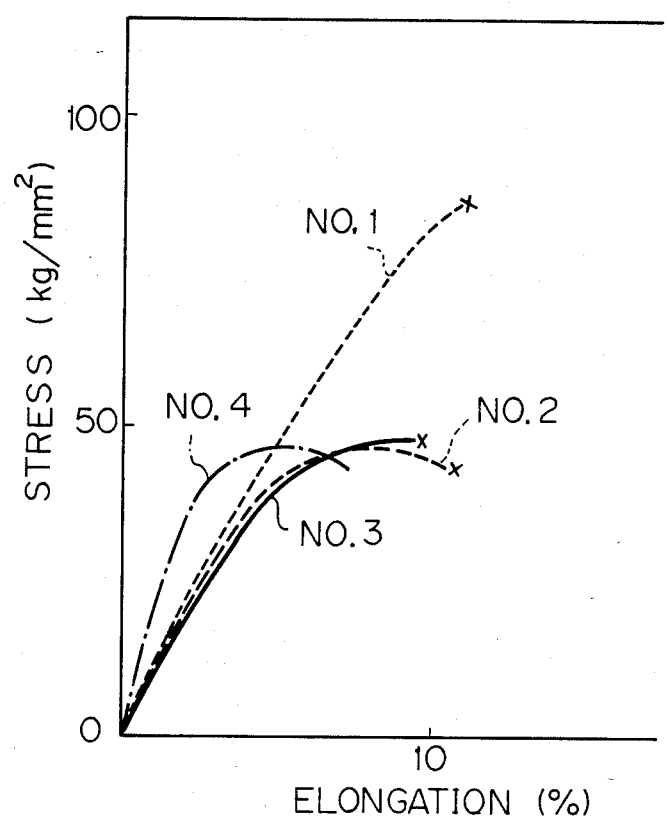
FIG. 3 is a graph for showing the result of tensile strength tests.

The test pieces Nos. 1 to 4 were subjected to tensile strength test whose result is graphically shown in FIG. 3. In FIG. 3, the dot curve is for the test piece No. 1 the long dot curve is for the test piece No. 2, the solid curve is for the test piece No. 3 and the chain curve is for the test piece No. 4.

It is clear from FIG. 3, that the test piece No. 1 made of the clad material of the present invention exhibits higher mechanical strength than those made of the conventional clad materials. As the strength ratio of the clad material of the present invention with respect to the conventional clad materials is about 1.8, about 45% reduction in transverse cross section is expected for production of a product of same mechanical strength.

Eyeglass frames of same design were produced from the test pieces No. 1 and a test piece No. 5 made of Ni—Cr alloy and their weight and rate of weight reduction are enlisted in Table 1.

TABLE 1

| Test piece | weight (g) | Rate of weight reduction (%) | Classification |
| --- | --- | --- | --- |
| No. 1 | 9 | 57 | inventional |
| No. 4 | 13 | 40 | conventional |
| No. 5 | 21 | — | conventional |

When an eyeglass from same in shape as the test piece No. 5 and same in material as the test piece No. 1 was produced, the rate of weight reduction was about 40%. When an eyeglass frame same in strength as the test piece No. 5 and same in material as the test piece No. 1 was produced, the rate of weight reduction was about 67%. When strength required for brazed parts were taken into consideration, the actual value was about 57%.

It is clear from the Table that weight of eyeglass frames can be reduced by as much as 57% when the clad material of the present invention is used for their production.

We claim:

1. A clad material for ornamental use comprising a core made of Ti or Ti-base alloy, and a sheath made of age-hardened alloy clad to said core, said sheath of a Cu-based alloy consisting essentially of 10 to 25% by weight of Ni, 5 to 25% by weight of Mn and Cu substantially in balance.

2. A clad material as claimed in claim 1 in which the cross sectional surface ratio of said sheath with respect to said core is in a range of from 5 to 25%.

3. A clad material as claimed in claim 1 wherein said age-hardenable alloy is age-hardened.

4. A clad material for ornamental use comprising a core made of Ti or Ti-base alloy, and a sheath made of age-hardened alloy clad to said core, said sheath of a Cu-based alloy consisting essentially of 5 to 15% by weight of Ni, 1 to 8% by weight Al and Cu substantially in balance.

5. A clad material as claimed in claim 4 in which the cross-sectional surface ratio of said sheath with respect to said core is in a range from 5 to 25%.

6. A clad material as claimed in claim 4 wherein said age-hardenable alloy is age-hardened.

7. A clad material for ornamental use comprising a core made of Ti or Ti-base alloy, and a sheath made of age-hardened alloy clad to said core, said sheath of a Cu-based alloy consisting essentially of 0.1 to 5% by weight of Be and Cu substantially in balance.

8. A clad material as claimed in claim 7 in which the cross-sectional surface ratio of said sheath with respect to said core is in a range from 5 to 25%.

9. A clad material as claimed in claim 7 wherein said age-hardenable alloy is age-hardened.

10. A clad material for ornamental use comprising a core made of Ti or Ti-base alloy, and a sheath made of age-hardened alloy clad to said core, said sheath of a Cu-based alloy consisting essentially of 0.1 to 5% by weight of Be 0.1 to 10% by weight of Ni and Cu substantially in balance.

11. A clad material as claimed in claim 10 in which the cross-sectional surface ratio of said sheath with respect to said core is in a range from 5 to 25%.

12. A clad material as claimed in claim 10 wherein said age-hardenable alloy is age-hardened.

13. A clad material for ornamental use comprising a core made of Ti or Ti-base alloy, and a sheath made of age-hardened alloy clad to said core, said sheath of a Ni-based alloy consisting essentially of 4 to 20% by weight of Cr, 0.1 to 2.0% by weight of Be, 0.1 to 2.0% by weight of Cu and Ni substantially in balance.

14. A clad material as claimed in claim 13 in which the cross-sectional surface ratio of said sheath with respect to said core is in a range from 5 to 25%.

15. A clad material as claimed in claim 13 wherein said age-hardenable alloy is age-hardened.

* * * * *